United States Patent [19]

Wendt

[11] 3,995,584
[45] Dec. 7, 1976

[54] PORTABLE ULTRASONIC SOLDERING POT

[75] Inventor: Michael E. Wendt, Tyler, Tex.

[73] Assignee: General Electric Company, Louisville, Ky.

[22] Filed: Feb. 27, 1976

[21] Appl. No.: 661,854

[52] U.S. Cl. ............................ 118/72; 118/400; 134/1; 228/262; 259/DIG. 44; 427/57

[51] Int. Cl.² ...................................... B05C 3/04

[58] Field of Search ................. 118/72, 400, 429; 228/262; 134/1, 184; 68/3 SS; 259/DIG. 44; 427/57, 246, 247

[56] References Cited

UNITED STATES PATENTS

| | | | |
|---|---|---|---|
| 2,671,264 | 3/1954 | Pessel | 228/262 X |
| 2,760,501 | 8/1956 | Gander | 134/184 X |
| 2,779,695 | 1/1957 | Brown | 134/1 |
| 3,203,824 | 8/1965 | McQuaid et al. | 118/72 X |
| 3,217,405 | 11/1965 | Das | 427/57 X |
| 3,414,966 | 12/1968 | Devin et al. | 228/262 X |
| 3,449,163 | 6/1969 | Mobius et al. | 134/1 |
| 3,660,860 | 5/1972 | Uziuk | 259/DIG. 44 |
| 3,752,381 | 8/1973 | Watson, Jr. | 118/400 X |
| 3,920,176 | 11/1975 | Becker et al. | 228/262 X |

*Primary Examiner*—Morris Kaplan
*Attorney, Agent, or Firm*—Frank P. Giacalone; Francis H. Boos

[57] ABSTRACT

The present invention provides a portable, hand-held tool that is effective in coating the end portion of a metal tube member with a layer of metal. The tool includes a heated tank portion containing the molten metal for coating the end portion, and an ultrasonic transducer for imparting ultrasonic energy to the tube member while the end portion is arranged in the molten metal so that the submerged end portion is scrubbed free of oxide and coated with a layer of metal.

4 Claims, 3 Drawing Figures

U.S. Patent  Dec. 7, 1976  3,995,584
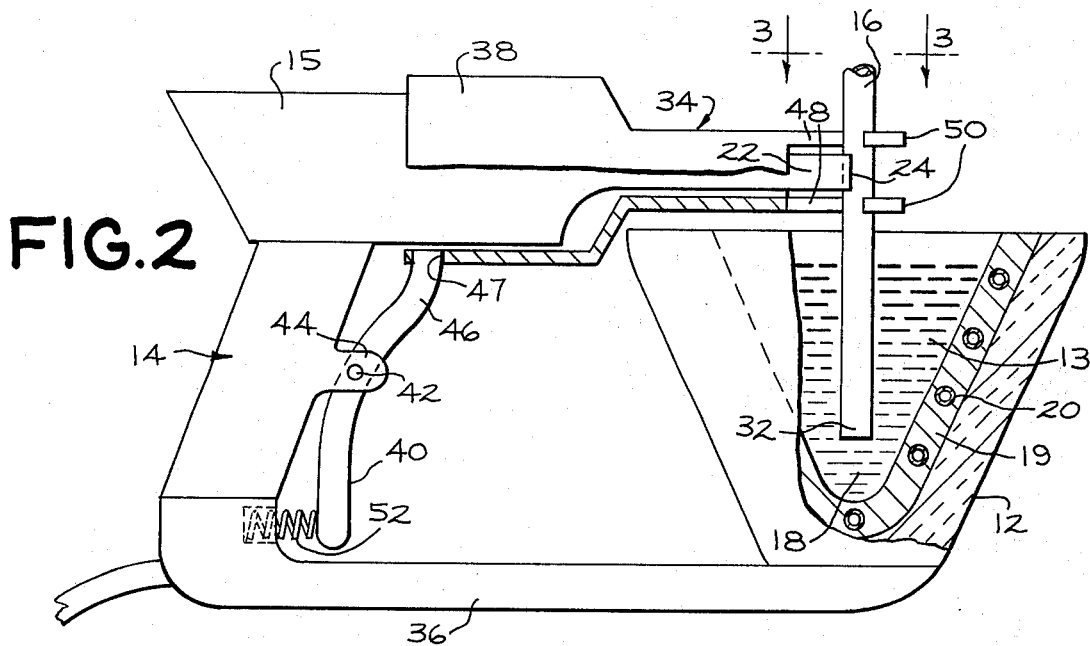
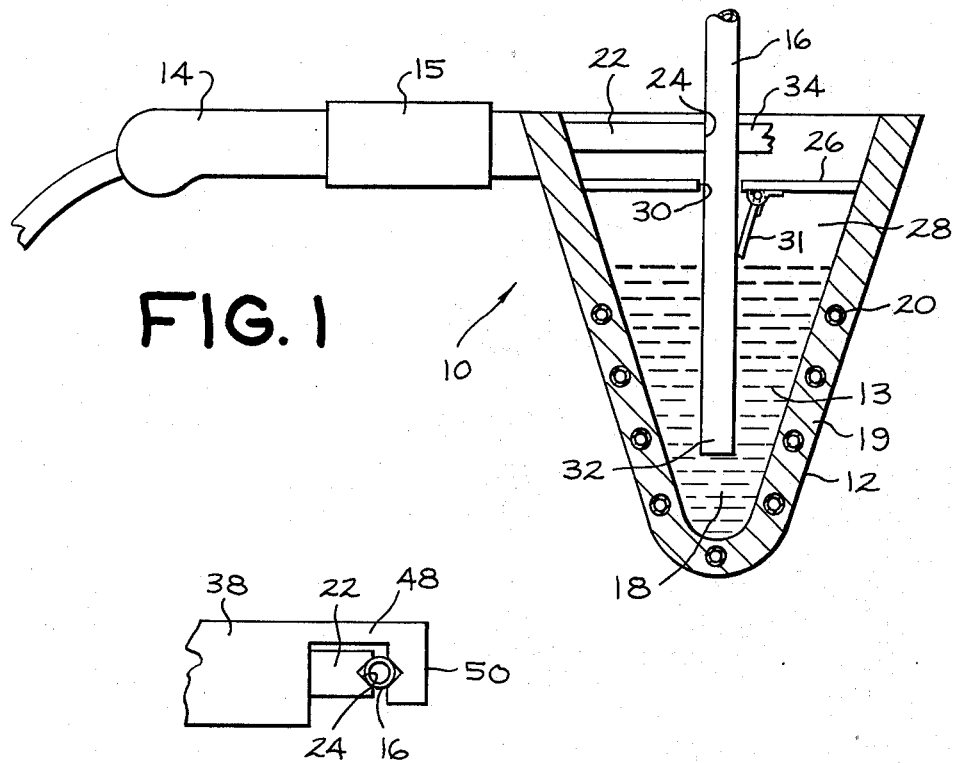

PORTABLE ULTRASONIC SOLDERING POT

BACKGROUND OF THE INVENTION

1. Field of the Invention

The present invention is directed to a hand-held portable tool for pretinning the end portion of a tube member that includes a source of ultrasonic energy and a tank portion for containing a bath of molten metal. In use, a tube end portion to be coated or pretinned with a layer of metal is arranged in the tank with ultrasonic energy source in intimate contact with the tube member so that the ultrasonic energy is transmitted to the end portion to cause the oxide to be scrubbed off and the surface coated with a layer of metal.

2. Description of the Prior Art

In manufacturing heat exchangers for use in refrigeration systems, it is customary to assemble them as a unit and then, at some later time, connect them to the other components of the refrigeration system. Generally, heat exchange assemblies lend themselves effectively to mass or automatic production techniques in that many of the joints such as return bends may be joined at the same time. However, the tube ends connecting the heat exchangers to the other components of the refrigeration system remain to be done individually and, accordingly, is usually a tedious time-consuming operation.

In preparing the tube end portions to be joined it is necessary to effect a complete removal of oxide from the surfaces to be joined. One method of effectively removing the oxide is in the presence of a molten alloy by means of an ultrasonic soldering pot, such as the one disclosed in U.S. Pat. No. 3,762,368-Struhe et al. Generally, an object to be cleaned of oxide and coated is placed in an alloy bath held in a container. A transducer is utilized to permeate the alloy with ultrasonic waves to cause cavitation which provide a good cleaning and coating action on the surface to be joined.

The use of the ultrasonic coating or joining is attractive when employed in mass or quantity production of heat exchangers where a plurality of parts may be arranged so as to be immersed in the alloy at the same time and coated or joined simultaneously. This is especially true when heat exchangers having return bends are to be assembled, wherein, the return bends are placed on the appropriate tube ends and the entire end portion including the return bends are immersed, as for example, in the ultrasonic soldering pot of the Struhe et al patent and accordingly all of the joints are made simultaneously.

In connecting the completed heat exchanger assembly to the other components necessary to complete the refrigeration system, the use of a soldering pot is generally not possible. This is especially true when the tube ends to be coated or joined to other components of the refrigeration system are so arranged and located on the heat exchanger that a substantial portion of the heat exchanger may have to be immersed in the alloy together with the selected portion. Generally this results not only in the excessive use of coating material but the entire heat exchanger assembly must be manipulated each time a portion is to be coated or joined.

SUMMARY OF THE INVENTION

The present invention is directed to an ultrasonic hand-held portable tool for coating the end portion of a metal with a layer of metal. The tool includes a tank portion which has a heating means associated therewith for maintaining a bath of metal in a molten state and a handle portion for holding the tool when it is applied to the end portion to be coated. An ultrasonic transducer is arranged so that it extends over the tank above the surface of the molten metal. The tool is provided with means for locating the tube member radially relative to the transducer and holding means movable relative to the transducer for securing the tube member in intimate contact with the transducer with sufficient pressure to cause the molten metal to scrub and coat the end portion with a layer of metal.

BRIEF DESCRIPTION OF THE DRAWINGS

FIG. 1 is an elevational view in section of the portable ultrasonic tool in accordance with the present invention;

FIG. 2 is an elevational view in section of an alternative embodiment of the invention; and FIG. 3 is a fragmentary view taken along lines 3—3 of FIG. 2.

DESCRIPTION OF THE PREFERRED EMBODIMENT

Referring now to the drawings and more particularly to FIG. 1, there is shown an embodiment of the present portable hand held tool 10. Generally the tool 10 includes a tank portion 12 for containing a quantity of molten solder alloy 13, a handle portion 14 for permitting the carrying and transporting of the tool 10 by the user and an ultrasonic energy source or gun 15. In operation, a tube member 16 to be coated with a layer of solder is located in the solder bath 18 and arranged as will hereinafter be explained so that a sufficient level of ultrasonic energy is applied to the tube member 16 to scrub and clean the layer of oxide from the surface and thereby allowing the wetting and coating of the surface with a layer of solder.

Means are provided for melting and thereafter holding the temperature of the solder above its melting point. Accordingly the tank 12 may have imbedded in its walls 19 heating elements 20 which have a heat output sufficient to maintain the alloy 13 in a molten state. In carrying out the present embodiment of the invention the solder employed consisted of 95% Zn – 5% Al and was maintained in a molten state at between 750° F to 950° F while the tube member was aluminum.

The ultrasonic energy source 15 used in conjunction with tool 10 was ultrasonic solder gun manufactured by "Blackstone Corp., Jamestown, New York" and identified as AG1. The ultrasonic energy source 15 is arranged or carried in handle portion 14 and includes a transducer horn 22 which, as shown, projects or extends into the tank area 12 and is located over the surface of the solder bath 18 so that its forward or tube contacting surface 24 is positioned to engage the tube member 16 when it is in the tank 12.

In order to keep the molten solder 13 from spilling during those periods of use when it is being manipulated or otherwise moved, a cover or lid portion 26 is provided which encloses or forms a closed chamber or area 28 which in effect contains the solder 18 and accordingly prevents it from splashing or spilling out of the tank portion 12. It should be noted that cover 26 while functioning as an anti-spill means, is also utilized in this embodiment as part of a means for locating the tube member 16 adjacent the contact surface 24 of transducer horn 22.

Accordingly, an aperture 30 is arranged below the transducer horn 22 so that the contacting surface 24 aligns substantially with the peripheral edge of the aperture 30. To prevent spilling of solder through opening 30, a valve 31 is provided that is normally biased to a position over opening 30 and is rotated to its open position by end portion 32 as it passes through the opening 30. In effect when tool 10 is manipulated so that the tube member 16 is received into the tank chamber 28 through the aperture 30 in a substantially vertical position with the entrance thereto pointing downwardly, the side wall of the tube member 16 is maintained in contact with the transducer 22 so that the ultrasonic energy is transferred effectively to the end portion 32.

Generally the tube member 16 as mentioned hereinbefore, is part of an assembly such as a heat exchanger and the user of the tool must maintain the transducer horn 22 against the tube member 16 to cause sufficient transfer of energy to be transmitted to the end portion 32 to permit its effective scrubbing and coating. However, there may be enough flexibility and movement of tube member 16 to preclude the operator from maintaining a sufficient amount of pressure to effect the coating of portion 32. To this end a holding means 34 is provided for maintaining tube 16 firmly against transducer horn 22 during the coating process. Accordingly, in the embodiment of FIG. 1 the holding means 34 is arranged diametrically from the transducer horn 22 contacting surface 24. The holding means 34 is shown schematically in the embodiment of FIG. 1 and the exact configuration, its application relative to tube 16 and transducer horn 22, may vary. It should be noted, however, that an effective amount of energy was transferred from transducer horn 22 to the tube end portion 32 by the holding means 34 when the tube was maintained against contact surface 24 by a pressure of at least 2 pounds force.

Referring now to FIG. 2, there is shown a second embodiment of the invention wherein parts identical to those of the embodiment of FIG. 1 are shown by the same numerals.

In this embodiment the holding means 34 is actuated from the handle 14 by the user of the tool and as a result lends itself to a one hand operated tool. Accordingly, the handle portion 14 is carried on and projects upwardly from one end of a support arm 36. The tank portion 12 is spaced from the handle 14 and carried on the other end of support arm 36. An ultrasonic gun 15 of the type mentioned hereinbefore is mounted on the upper portion of the handle 14 with the transducer horn 22 projecting over the tank portion 12 as in the embodiment of FIG. 1.

Slidably arranged on the gun 15 is a sleeve member 38. The sleeve 38 is movable relative to the gun 15 by a trigger of lever 40. The lever 40 is pivotally mounted at 42 on a bracket or extension 44 projecting from handle 14. The upper end 46 of lever 44 is arranged in a slot 47 on sleeve 38 so that clockwise rotation of the lever 40 about its pivot 42 causes the sleeve member 38 to move towards the transducer horn 22 of gun 15. The end portion of sleeve 38 adjacent the transducer horn 22 has its side walls cut away to provide a bifurcated portion including a pair of holding arms 48 spaced from the upper and lower surfaces of transducer horn 22. As viewed in FIG. 3, the arms are located to the side of transducer horn 22 so that the tube 16 may be located on the contact surface 24. Extending transversely from each of the arms 48 are clamp members 50 extending parallel to the contact surface 24.

In operation, the clamp members 50 are moved in a direction away from the transducer horn contact surface 24 by rotating the lever 40 against action of spring 52 which causes sleeve 38 to slide on gun 15. With the clamp members 50 spaced from transducer horn contact surface 24, the tool 10 may then be manipulated so that tube member 16 is located between the transducer horn contact surface 24 and clamp members 50 with the end portion 32 to be coated arranged in the molten metal 18 in tank 12. The lever 40 is then released to clamp the tube 16 between transducer horn contact surface 24 and member 50 through action of spring 52. The spring 52 is selected to maintain the tube 16 against transducer horn contact surface 24 with sufficient pressure to cause the energy from the gun 15 to be transmitted to the end portion 32 to effect the removal of oxide and the resultant coating of the immersed end portion.

The foregoing is a description of the preferred embodiment of the invention and variations may be made thereto without departing from the true spirit of the invention, as defined by the appended claims.

What is claimed is:
1. An ultrasonic hand-held portable tool for coating the end portion of a metal tube member with a layer of metal comprising:
 a body member including a tank portion adapted to contain a bath of molten metal for receiving said end portion vertically with the entrance thereto pointing substantially downwardly, and a handle portion arranged on said body member for holding said portable tool when being applied to said end portion to be coated;
 heating means disposed on said tank portion for maintaining the metal in said tank in said molten state;
 ultrasonic transducer means on said handle portion extending over said tank to a position above the surface of said molten metal and including a tube contacting surface being adapted to direct ultrasonic energy to said tube member when it is positioned in said tank portion;
 locating means associated with said transducer means including holding means being manually movable relative to said transducer for positioning said tube member radially in said tank portion in intimate contact with said tube contacting surface;
 said manually movable holding means including clamp means arranged diametrically from said tube contacting surface; and
 manually operable means on said handle portion being connected to said holding means for articulating said clamp means relative to said contacting surface.

2. The invention as set forth in claim 1 including means associated with said manually operable means for biasing said clamp means toward said contact surface so that said tube member is held securely between said clamp means and said contact surface by said biasing means.

3. The invention as set forth in claim 2 wherein the tube member is aluminum and said molten metal consists of 95% Zn − 5% Aluminum.

4. The invention as set forth in claim 3 wherein the tube member is held in intimate contact with said transducer by a pressure of at least 2 pounds force.

* * * * *